United States Patent
Chen et al.

(10) Patent No.: US 7,408,771 B2
(45) Date of Patent: Aug. 5, 2008

(54) MOUNTING DEVICE FOR DATA STORAGE DEVICE

(75) Inventors: Yun-Lung Chen, Tu-Cheng (TW); Yi-Chong Hsiao, Tu-Cheng (TW); Li Tong, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 440 days.

(21) Appl. No.: 11/193,890

(22) Filed: Jul. 29, 2005

(65) Prior Publication Data
US 2006/0164803 A1   Jul. 27, 2006

(30) Foreign Application Priority Data
Jan. 26, 2005   (CN)   .................. 2005 2 0054361 U

(51) Int. Cl.
*H05K 5/00* (2006.01)
*H05K 7/00* (2006.01)
(52) U.S. Cl. ................. 361/685; 361/683; 361/686
(58) Field of Classification Search .......... 361/683, 361/684, 685, 686; 312/223.1, 223.2, 223.3
See application file for complete search history.

(56) References Cited

U.S. PATENT DOCUMENTS 5,588,728 A * 12/1996 Eldridge et al. .......... 312/332.1
6,067,225 A * 5/2000 Reznikov et al. ............ 361/685
6,193,339 B1 * 2/2001 Behl et al. ................ 312/223.2
6,293,636 B1 * 9/2001 Le et al. ................... 312/223.2
6,460,948 B2 * 10/2002 Roesner et al. .......... 312/223.1
6,543,866 B2 * 4/2003 Chen et al. ................ 312/223.2
7,016,190 B1 * 3/2006 Chang ....................... 361/685
7,088,580 B2 * 8/2006 Chen et al. .................. 361/685
7,259,960 B2 * 8/2007 Hua et al. ................... 361/685
2005/0103729 A1 * 5/2005 Chen et al. ..................... 211/26

FOREIGN PATENT DOCUMENTS

TW           190919          9/1992

* cited by examiner

*Primary Examiner*—Jayprakash N Gandhi
*Assistant Examiner*—Anthony M Haughton
(74) *Attorney, Agent, or Firm*—Morris Manning Martin LLP; Tim Tingkang Xia, Esq.

(57) ABSTRACT

A mounting assembly for securing a data storage device (10) includes a drive bracket (20) and a rotating member (40). The data storage device has sliding members (12) at opposite sides thereof. The drive bracket includes a pair of guiding slots (32, 52) for receiving the sliding member. A clip (35) extends from the drive bracket. The rotating member is pivotably mounted on the first side panel. The sliding members of the data storage device slide into the guiding slots. The rotating member is rotated to engage with the latching tab and secure at least one of the sliding members in the guiding slot.

15 Claims, 4 Drawing Sheets

MOUNTING DEVICE FOR DATA STORAGE DEVICE

BACKGROUND OF THE INVENTION

1. Field of the Invention

The present invention relates to mounting devices, and more particularly to a mounting device for mounting data storage devices in a computer enclosure.

2. Background of the Invention

Usually data storage devices, such as hard disk drives, floppy disk drives, and optical drives are simply screwed to a drive bracket of a computer enclosure. However, this conventional means of mounting data storage devices is known as painstaking and time-consuming.

Another mounting means is disclosed in Taiwan patent No. 190919. Two sliding members are secured on two sides of a data storage device. A hole is defined in a front portion of each of the sliding members. A drive bracket defines a pair of guiding slots and two threaded holes in a front portion thereof. The two sliding members slide into the guiding slots of the drive bracket, and two screws extend through the holes and screw in the threaded holes to secure the data storage device on the drive bracket. The data storage device is thus easily mounted. However, the mounting means described above is still inconvenient, for screws are also needed to stably mount the data storage device.

SUMMARY

Accordingly, what is needed is a mounting device for conveniently securing a data storage device.

A mounting assembly in accordance with a preferred embodiment of the present invention for securing a data storage device includes a drive bracket and a rotating member. The data storage device has sliding members at opposite sides thereof. The drive bracket includes a pair of guiding slots for receiving the sliding member. A clip extends from the drive bracket. The rotating member is pivotably mounted on the first side panel. The sliding members of the data storage device slide into the guiding slots. The rotating member is rotated to engage with the latching tab and secure at least one of the sliding members in the guiding slot.

Other advantages and novel features of the present invention will be drawn from the following detailed description of a preferred embodiment of the present invention with attached drawings, in which:

DETAILED DESCRIPTION OF PREFERRED EMBODIMENT

Figure 1:
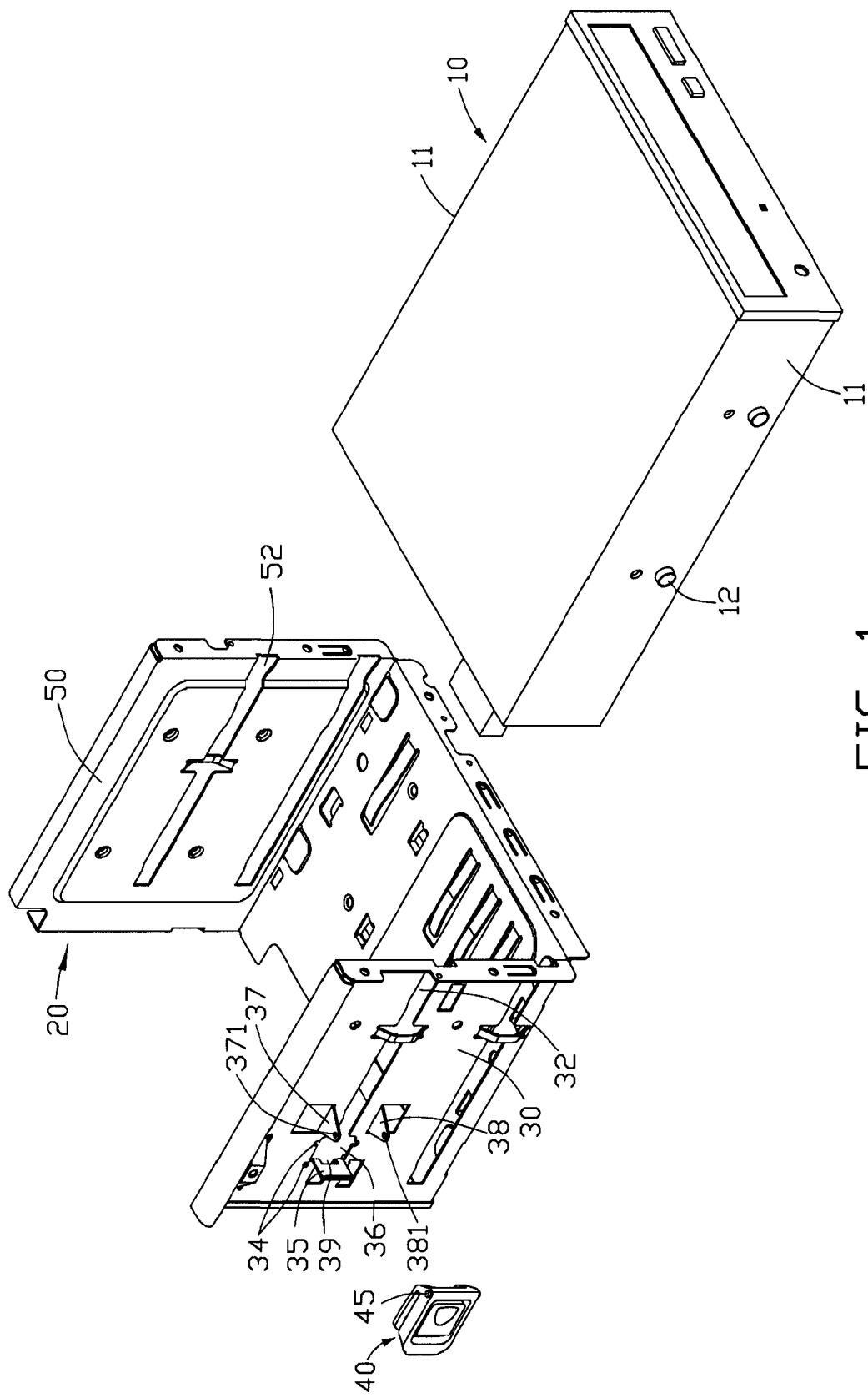
FIG. 1 is an exploded, isometric view of a mounting device for securing a data storage in accordance with a preferred embodiment of the present invention, including a drive bracket and a rotating member.

Referring to FIG. 1, a mounting device for securing a component like a data storage device 10 of an electronic device like a computer includes a drive bracket 20 and a rotating member 40.

The data storage device 10 has a pair of side plates 11. Two sliding members 12 protrude from the side plates 11 respectively.

The drive bracket 20 includes a first side panel 30 and a second side panel 50 parallel to the first side panel 30. The side panels 30, 50 respectively define a guiding slot 32, 52 therein. An opening 36 is defined at an end of the guiding slot 32 in the first panel 30. An L-shaped clip 35 protrudes outward from an edge of the opening 36. The clip 35 has a cutout 39 communicating with the opening 36. Four holes 34 are respectively defined at four corners of the opening 36. A pair of supporting tabs 37, 38 is formed at opposite sides of the guiding slot 32. Each of the supporting tabs 37, 38 defines a pivoting hole 371, 381 therein.

Figure 2:
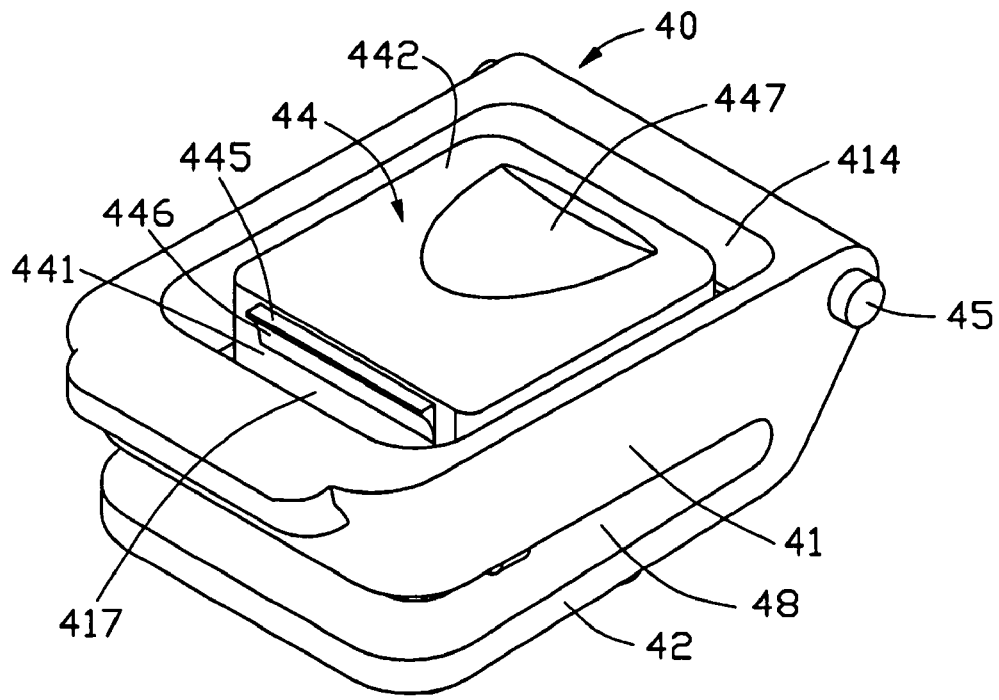
FIG. 2 is an enlarged, isometric view of the rotating member of FIG. 1.
Figure 3:
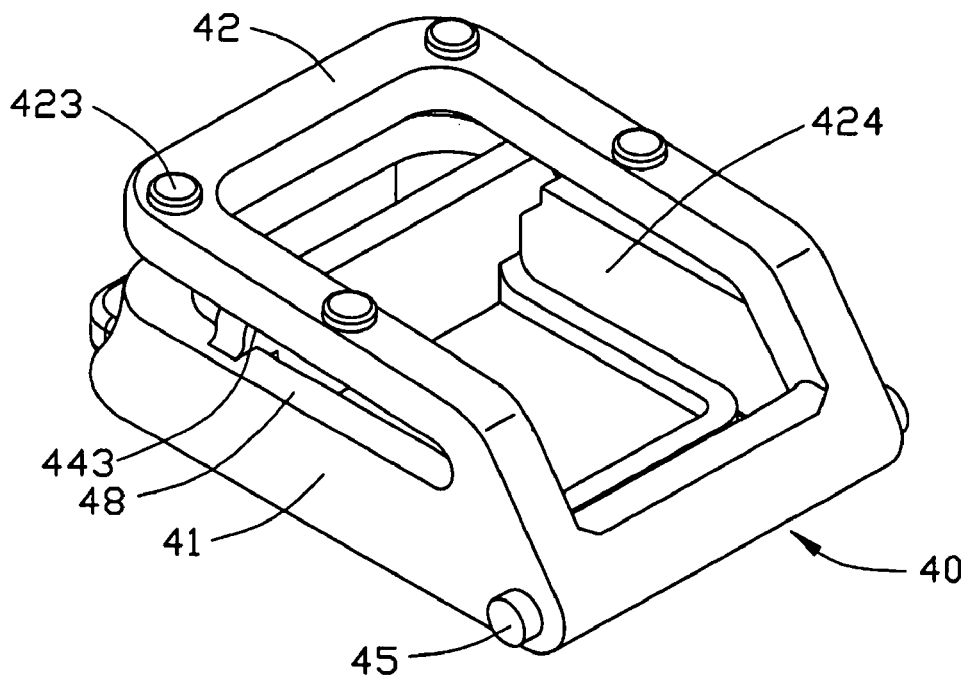
FIG. 3 is similar to FIG. 2, but viewed from another aspect.

Referring to FIGS. 2 and 3, the rotating member 40 includes a frame 41 and a base 42. The foresides of the frame 41 and the base 42 are joined together. A gap 48 is defined between the frame 41 and the base 42. The frame 41 and the base 42 can be elasticity deformed. A pair of pins 45 is formed on the frame 41. The frame 41 defines an opening 414 in the middle portion thereof. An L-shaped actuator 44 is secured in the opening 414. The L-shaped actuator 44 includes an upright wall 441 and a top wall 442. An aperture 417 is retained between the frame 41 and the upright wall 441. The top wall 442 has a free end with a recess 447 defined. A pair of feet 443 is formed at the bottom of the upright wall 441. The feet 443 are interferentially sandwiched in the gap 18, so that the actuator 44 is attached to the rotating member 40. A protrusion 445 projects from the upright wall 441 of the actuator 44. The protrusion 445 has an arc surface 446 at a bottom thereof. Four posts 423 are formed at a bottom of the base 42.

Figure 4:
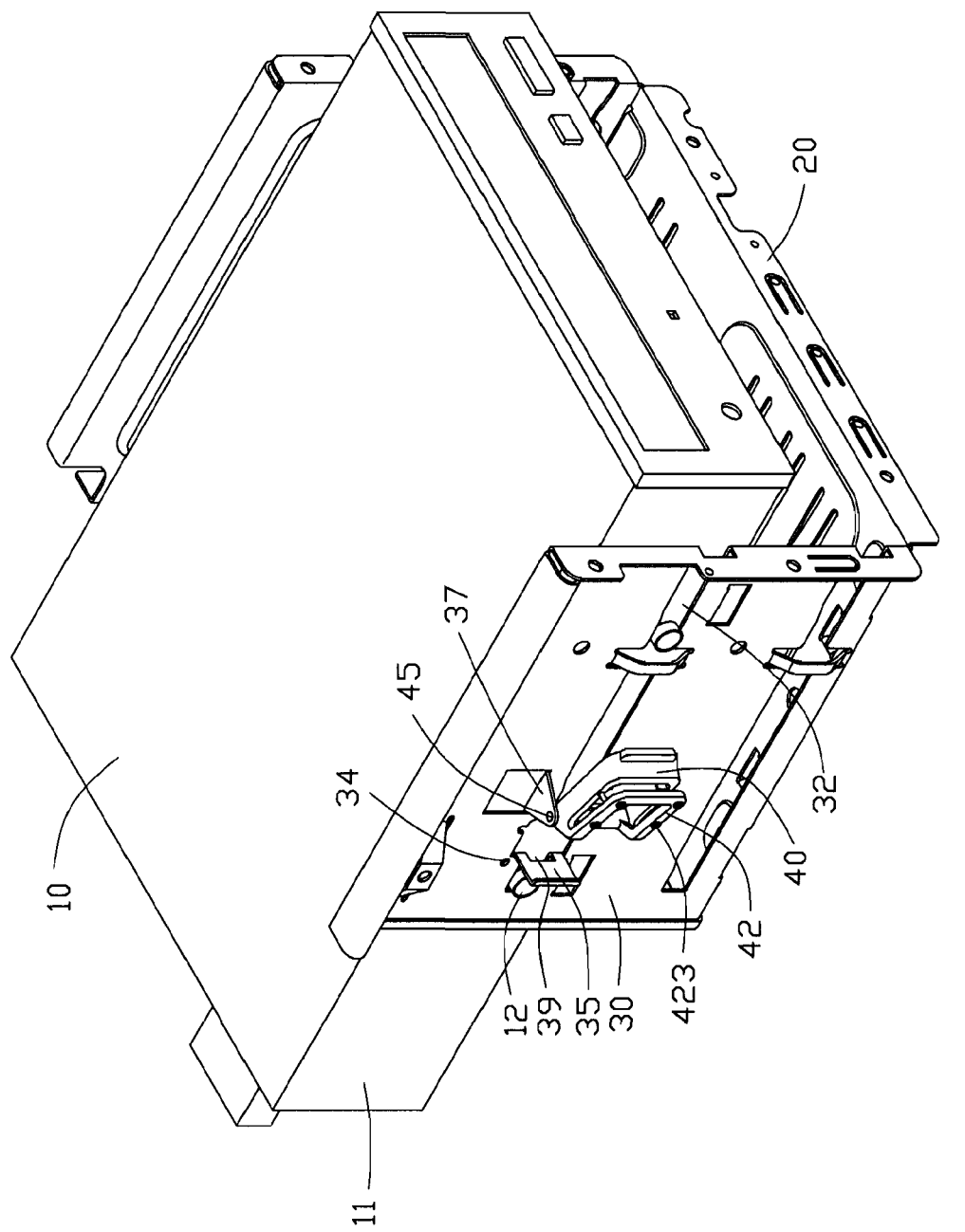
FIG. 4 is a pre-assembly view of FIG. 1, showing the rotating member in an opening position.

Referring to FIG. 4, in assembly, the pair of pins 45 is inserted into the pivoting holes 371, 381 of the supporting tabs 37, 38. The rotating member 40 is thus pivotally mounted on the supporting tabs 37, 38. The sliding members 12 of the data storage device 10 slide into the guiding slots 32, 52 of the drive bracket 20 through the cutout 39 of the clip 35. The data storage device 10 is put into the drive bracket 20.

Figure 5:
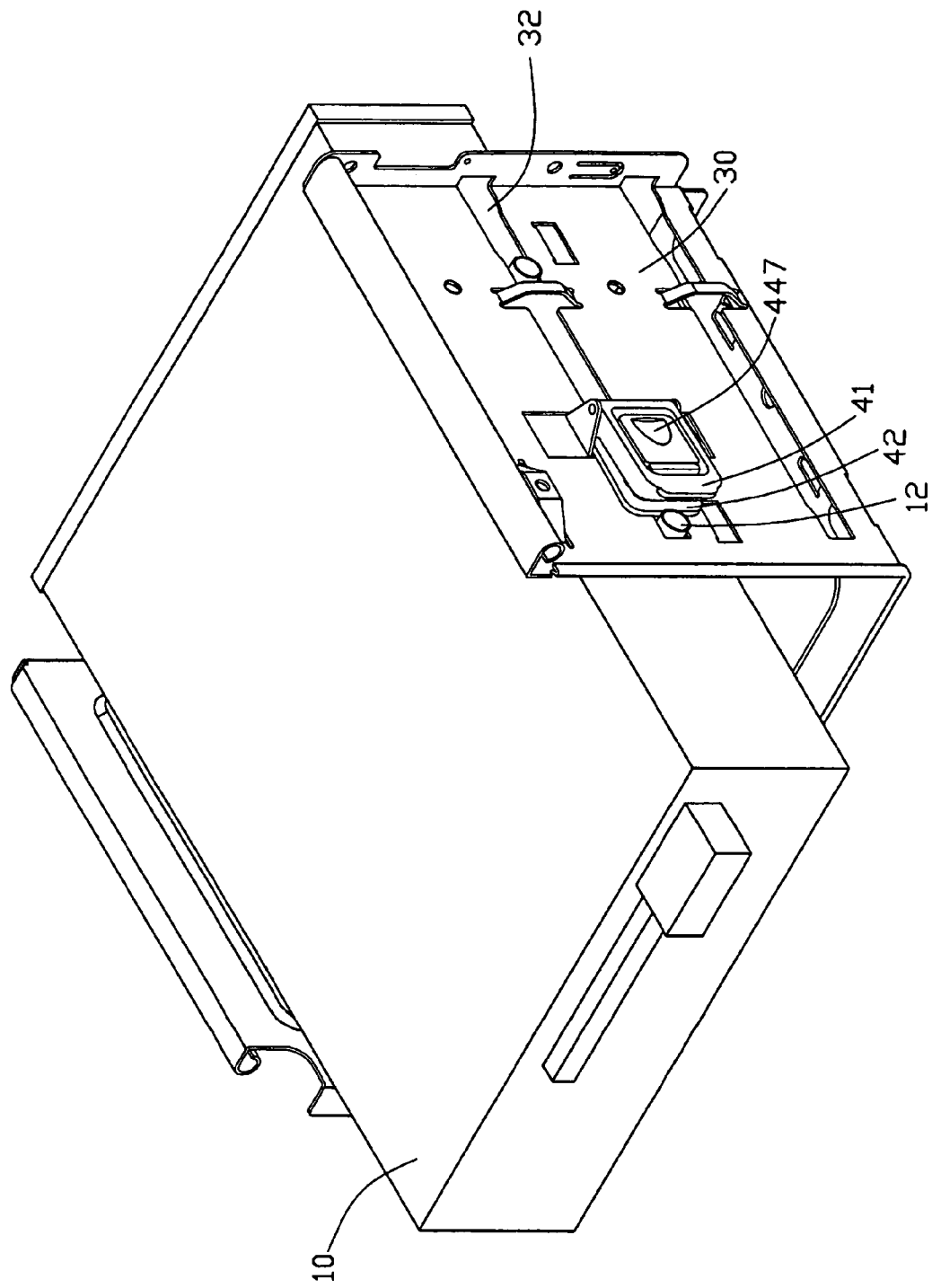
FIG. 5 is an assembly view of FIG. 1.

Referring to FIG. 5, rotating the rotating member 40, the four posts 423 of the base 42 are positioned into the four holes 34 of the first side panel 30. The bottom of the base 42 abuts on the side panel 30. The base 42 blocks the sliding member 12 of the data storage device 10 at the distal end of the guiding slot 32. At the same time, the clip 35 extends through the aperture 417 from the bottom of the base 42, and touches the arc surface 446. Then, the frame 41 is pressed. The gap 48 between the frame 41 and the base 42 is reduced. The clip 35 slides over the arc surface 446 and engages with the protrusion 445. The data storage device 10 is thus secured on the drive bracket 20.

When the data storage device 10 is disassembled from the drive bracket 20, the actuator 44 is pressed at the recess 447 thereof. The clip 35 disengages with the protrusion 445. The rotating member 40 can be rotated outward from the first side panel 30 and doesn't block the sliding member 12 of the data storage device 10. The data storage device 10 is ready to be removed from the drive bracket 20.

Variations may be made in the foregoing embodiment. For example, the actuator 44 may be secured on the frame 41 in other manner. A pair of rails can be set on the frame 41. The actuator 44 is secured on the rails, and connected with the frame 41 by a spring. When the clip 35 engages with the protrusion 445, the actuator 44 slides on the rail to break away the clip 35 from the protrusion 445. Then the actuator 44 slides back to previous position by the force of the spring. The rotating member 40 is rotated to remove the drive bracket 20.

It is to be understood, however, that even though numerous characteristics and advantages have been set forth in the description of the preferred embodiments, together with details of the structure and function the disclosure is illustrative only, and changes may be made in detail, especially in matters of shape, size, equivalent materials, and arrangement of parts within the principles of the invention to the full extent indicated by the broad general meaning of the terms in which the appended claims are expressed.

We claim:

1. A computer enclosure comprising:
a data storage device having sliding members at opposite sides thereof;
a drive bracket defining a pair of guiding slots for receiving the sliding members, a clip extending from the drive bracket adjacent to the guiding slot, the clip having a cutout communicating with the guiding slot; and
a rotating member pivotably mounted on the drive bracket;
wherein when the sliding members of the data storage device slide into the guiding slots, at least one of the sliding members slides to the end of the guiding slot through the cutout of the clip, the rotating member is rotated to engage with the clip and block the at least one of the sliding members in the guiding slot.

2. The computer enclosure as described in claim 1, wherein the rotating member comprises a frame and a base with a gap defined therebetween.

3. The computer enclosure as described in claim 2, wherein the rotating member further has an actuator inserted therein.

4. The computer enclosure as described in claim 3, wherein the actuator comprises a upright wall and a top wall.

5. The computer enclosure as described in claim 4, wherein a protrusion is formed on the upright wall for the clip engaging therewith.

6. The computer enclosure as described in claim 5, wherein the protrusion has an arc surface for the clip sliding over.

7. The computer enclosure as described in claim 3, wherein an aperture is retained between the frame and the actuator for the clip extending through.

8. The computer enclosure as described in claim 1, wherein a plurality of holes are defined on the drive bracket, and a plurality of posts are formed on a bottom of the rotating member corresponding to the drive bracket for engaging in the plurality of holes.

9. The computer enclosure as described in claim 1, wherein a pair of supporting tabs are formed at opposite sides of the guiding slot for supporting the rotating member thereon.

10. A mounting assembly for securing a data storage device comprising:
a sliding member protruded from the data storage device;
a drive bracket defining a guiding slot for receiving the sliding member, a clip formed from the drive bracket; and
securing means adapted to be mounted on the drive bracket, the securing means being deformable;
whereby after the securing means resists against the sliding member, the securing means is deformed to engage with the clip of the drive bracket, thereby securing the data storage device on the drive bracket;
wherein the securing means comprises a frame and a base with a gap defined therebetween, the securing means further has an actuator secured on the frame, an aperture is retained between the frame and the actuator for the clip extending through.

11. The mounting assembly as described in claim 10, wherein the securing means is a rotating member pivotably mounted on the drive bracket.

12. The mounting assembly as described in claim 10, wherein the actuator comprises a upright wall and a top wall.

13. The mounting assembly as described in claim 12, wherein a protrusion is formed on the upright wall for the clip engaging therewith.

14. The mounting assembly as described in claim 13, wherein the protrusion has an arc surface for the clip sliding over.

15. A computer enclosure comprising:
a data storage device having sliding members at opposite sides thereof;
a drive bracket defining a pair of guiding slots for receiving the sliding members, a clip extending from the drive bracket; and
a rotating member pivotably mounted on the drive bracket;
wherein when the sliding members of the data storage device slide into the guiding slots, the rotating member is rotated to engage with the clip and secure at least one of the sliding members in the guiding slot; and
wherein the rotating member comprises a frame and a base with a gap defined therebetween, and further has an actuator inserted therein, an aperture is formed between the frame and the actuator for the clip extending therethrough.

* * * * *